United States Patent
Acharya et al.

(10) Patent No.: US 12,063,529 B2
(45) Date of Patent: Aug. 13, 2024

(54) MOBILITY ROBUSTNESS OPTIMIZATION IN WIRELESS COMMUNICATION NETWORK

(71) Applicant: Nokia Solutions and Networks Oy, Espoo (FI)

(72) Inventors: Abhilash Acharya, Bangalore (IN); Ghanender Pahuja, Bangalore (IN)

(73) Assignee: Nokia Solutions and Networks Oy, Espoo, FL (US)

( * ) Notice: Subject to any disclaimer, the term of this patent is extended or adjusted under 35 U.S.C. 154(b) by 0 days.

(21) Appl. No.: 18/404,080

(22) Filed: Jan. 4, 2024

(65) Prior Publication Data

US 2024/0224078 A1  Jul. 4, 2024

(30) Foreign Application Priority Data

Jan. 4, 2023 (FI) ...................................... 20235013

(51) Int. Cl.
*H04W 24/02* (2009.01)
*H04W 36/24* (2009.01)
*H04W 36/30* (2009.01)

(52) U.S. Cl.
CPC .......... *H04W 24/02* (2013.01); *H04W 36/249* (2023.05); *H04W 36/305* (2018.08)

(58) Field of Classification Search
CPC ............................ H04W 36/30; H04L 47/823
USPC .......................................... 455/437; 370/254
See application file for complete search history.

(56) References Cited

U.S. PATENT DOCUMENTS

| 7,092,405 B2 * | 8/2006 | Guo ................. H04W 36/0088 |
| | | 370/468 |
| 11,109,283 B1 * | 8/2021 | Kulkarni ........... H04W 36/0055 |
| 2015/0172966 A1 | 6/2015 | Watanabe |

(Continued)

FOREIGN PATENT DOCUMENTS

| WO | WO 2022/034114 A1 | 2/2022 |
| WO | WO 2022/058013 A1 | 3/2022 |
| WO | WO 2022/258196 A1 | 12/2022 |

OTHER PUBLICATIONS

Finnish Patent and Registration Office—Search Report, Aug. 28, 2023, FI Appln. 20235013.

(Continued)

*Primary Examiner* — Kiet M Doan
(74) *Attorney, Agent, or Firm* — Lippes Mathias LLP

(57) ABSTRACT

A technical solution is proposed, which allows mobility experience to be improved by properly tuning Cell Individual Offset (CIO) and/or Time-To-Trigger (TTT) parameters in a wireless communication network. More specifically, information about a number of Handover (HO) attempts made between a source network node and each of its neighboring network nodes for a predefined period of time and a number of occurrences of each type of HO problems during the HO attempts are collected as a data vector. Then, for each "source network node—neighboring network node" pair, two data sub-vectors are obtained by aggregating the numbers from the data vector at a carrier level and an inter-node level, respectively. After that, the two data sub-vectors are used by an ensemble of two Machine-Learning models to predict whether the TTT and/or CIO parameters need to be changed.

11 Claims, 10 Drawing Sheets

(56) References Cited

U.S. PATENT DOCUMENTS

2019/0261197 A1* 8/2019 Bellamkonda ........ H04W 24/02
2020/0356834 A1 11/2020 Zhou et al.

OTHER PUBLICATIONS

Mavenir Inc. "Beam Management Enhancement using AI/ML", R1-2204938 3GPP TSG RAN WG1 #108-e, e-Meeting, May 9-20, 2022, 3 pgs.

* cited by examiner

| Time | Scell | Tcell | Scell Tech | Scell EARFCN | Tcell EARFCN | TE | TL | PP | HOatt | RLF_RATIO | TF_KPI_RATIO | TS_KPI_RATIO | PP_RATIO | TF_TS_diff (abs) | CIO/TTT |
|---|---|---|---|---|---|---|---|---|---|---|---|---|---|---|---|
| T0 | Cell_A | Cell_B | FDD/TDD | - | - | - | - | - | - | - | - | - | - | - | - |

FIG. 7

MOBILITY ROBUSTNESS OPTIMIZATION IN WIRELESS COMMUNICATION NETWORK

TECHNICAL FIELD

The present disclosure relates generally to the field of wireless communications, and particularly to a technique for optimizing mobility robustness in a wireless communication network by properly tuning mobility parameters, such as Cell Individual Offset (CIO) and Time-To-Trigger (TTT).

BACKGROUND

Mobility Robustness Optimization (MRO) is a key use case for User Equipment (UE) mobility and plays a vital role in providing a stable and reliable connection during the UE mobility. Moreover, since network complexity in 4G and 5G technologies continues to increase, and traffic patterns usually change during the day, there is a need to constantly tune mobility parameters to ensure seamless connectivity experience for UEs.

The MRO is primarily aimed at reducing Radio Link Failures (RLFs) and unnecessary HOs (also referred to as Ping-Pong (PP) HOs). When moving from one cell to another, UEs may be impacted with the RLFs and the PP HOs, which may lead to poor experience during inter-cell HO. This may be caused by improperly set mobility parameters, such as CIO and TTT parameters.

Thus, there is a need for a technical solution that would allow the CIO and TTT parameters to be tuned depending on changes in the RLF and PP HO trends which are caused by time-varying traffic patterns.

SUMMARY

This summary is provided to introduce a selection of concepts in a simplified form that are further described below in the detailed description. This summary is not intended to identify key features of the present disclosure, nor is it intended to be used to limit the scope of the present disclosure.

It is an objective of the present disclosure to provide a technical solution that allows mobility experience to be improved by properly tuning CIO and/or TTT parameters in a wireless communication network.

The objective above is achieved by the features of the independent claims in the appended claims. Further embodiments and examples are apparent from the dependent claims, the detailed description, and the accompanying drawings.

According to a first aspect, a network entity in a wireless communication network is provided. The network entity comprises at least one processor and at least one memory. The at least one memory stores instructions that, when executed by the at least one processor, cause the network entity to operate at least as follows. At first, the network entity receives a data vector comprising: (i) a number of HO attempts made between a source network node and at least one neighboring network node within a time period, and (ii) a number of occurrences of at least one type of HO problems between the source network node and the at least one neighboring network node during the HO attempts. Then, the network entity performs the following operations for each neighboring network node of the at least one neighboring network node. The network entity obtains a first data sub-vector by aggregating those numbers (i) and (ii) from the data vector which are interrelated at a level of a carrier used by the source network node and the neighboring network node. Next, the network entity uses a first Machine-Learning (ML) model to predict whether a TTT parameter needs to be increased, decreased or remain unchanged. The first ML model is configured to use the first data sub-vector as input data. By properly tuning the TTT parameter (i.e., deciding whether to increase, decrease or remain it unchanged), the network entity may reduce the number of occurrences of one or more types of HO problems (e.g., RLFs and/or PP HOs) in the wireless communication network, thereby improving the overall mobility experience.

In one example embodiment of the first aspect, the at least one type of HO problems comprises at least one of: Too-Late HO, Too-Early Type 1 HO, Too-Early Type 2 HO, and PP HO. By using the number of occurrences of one or more of these types of HO problems in the first ML model, it is possible to provide efficient TTT parameter change prediction.

In one example embodiment of the first aspect, the network entity is further caused to supplement the data vector with at least one of the following values:

$$RLF\_RATIO=(TE1+TE2+TL)/(HOatt+TL),$$

$$TF\_TS\_diff=abs[((TE1+TE2)-TL)/(TE+TL)], \text{ and}$$

$$PP\_RATIO=PP/HOatt,$$

where TE1 is the number of occurrences of the Too-Early Type 1 HO between the source network node and each of the at least one neighboring network node, TE2 is the number of occurrences of the Too-Early Type 2 HO between the source network node and each of the at least one neighboring network node, TE=TE1+TE2, TL is the number of occurrences of the Too-Late HO between the source network node and each of the at least one neighboring network node, PP is the number of occurrences of the PP HO between the source network node and each of the at least one neighboring network node, and HOatt is the number of the HO attempts made between the source network node and each of the at least one neighboring network node. By using these additional values in the first ML model, it is possible to increase the efficiency of the TTT parameter change prediction.

In one example embodiment of the first aspect, the first ML model is configured as a Double Deep Q-Network (DDQN). By using the DDQN, it is possible to increase the efficiency of the TTT parameter change prediction.

In one example embodiment of the first aspect, the network entity is further caused to perform the following operations for each neighboring network node of the at least one neighboring network node. The network entity obtains a second data sub-vector by aggregating those numbers (i) and (ii) from the data vector which are interrelated at an inter-node level for a pair of the source network node and the neighboring network node. If a prediction result of the first ML model is that the TTT parameter needs to remain unchanged, the network entity predicts, by using a second ML model, whether a CIO parameter needs to be increased, decreased or remain unchanged. The second ML model is configured to use the prediction result of the first ML model and the second data sub-vector as input data. Thus, CIO parameter change prediction may be triggered in response to the "no change" result predicted for the TTT parameter. Similarly, by properly tuning the CIO parameter (i.e., deciding whether to increase, decrease or remain it unchanged), the network entity may reduce the number of occurrences of one or more types of HO problems (e.g., RLFs and/or PP HOs) in the wireless communication network, thereby improving the overall mobility experience.

In one example embodiment of the first aspect, the second ML model is also configured as a DDQN. By using the DDQN, it is possible to increase the efficiency of the CIO parameter change prediction.

In one example embodiment of the first aspect, the network entity is further caused to perform the following operations. The network entity receives another data vector comprising: (i) a number of HO attempts made between the source network node and the at least one neighboring network node within another time period, and (ii) a number of occurrences of the at least one type of HO problems between the source network node and the at least one neighboring network node during the HO attempts. Then, the network entity calculates a difference between the numbers (ii) of the data vector and said another data vector. Next, the network entity calculates a reward for the data vector based on whether the difference is more than, less than or equal to a threshold value. After that, the network entity trains at least one of the first ML model and the second ML model by using the reward. By using such a reward in the training phase of the first ML model and the second ML model, it is possible to increase their prediction accuracy.

According to a second aspect, a method for operating a network entity in a wireless communication network is provided. The method starts with the step of receiving a data vector comprising: (i) a number of HO attempts made between a source network node and at least one neighboring network node within a time period, and (ii) a number of occurrences of at least one type of HO problems between the source network node and the at least one neighboring network node during the HO attempts. Then, the method proceeds to the following steps performed for each neighboring network node of the at least one neighboring network node:

obtaining a first data sub-vector by aggregating those numbers (i) and (ii) from the data vector which are interrelated at a level of a carrier used by the source network node and the neighboring network node; and by using a first ML model, predicting whether a TTT parameter needs to be increased, decreased or remain unchanged, the first ML model being configured to use the first data sub-vector as input data.

By properly tuning the TTT parameter (i.e., deciding whether to increase, decrease or remain them unchanged), it is possible to reduce the number of occurrences of one or more types of HO problems (e.g., RLFs and/or PP Hos) in the wireless communication network, thereby improving the overall mobility experience.

In one example embodiment of the second aspect, the at least one type of HO problems comprises at least one of: Too-Late HO, Too-Early Type 1 HO, Too-Early Type 2 HO, and Ping-Pong HO. By using the number of occurrences of one or more of these types of HO problems in the first ML model, it is possible to provide efficient TTT parameter change prediction. In one example embodiment of the second aspect, the method further comprises the step of supplementing the data vector with at least one of the following values:

RLF_RATIO=(TE1+TE2+TL)/(HOatt+TL),

TF_TS_diff=abs[((TE1+TE2)−TL)/(TE+TL)], and

PP_RATIO=PP/HOatt, where TE1 is the number of occurrences of the Too-Early Type 1 HO between the source network node and each of the at least one neighboring network node, TE2 is the number of occurrences of the Too-Early Type 2 HO between the source network node and each of the at least one neighboring network node, TE=TE1+TE2, TL is the number of occurrences of the Too-Late HO between the source network node and each of the at least one neighboring network node, PP is the number of occurrences of the PP HO between the source network node and each of the at least one neighboring network node, and HOatt is the number of the HO attempts made between the source network node and each of the at least one neighboring network node. By using these additional values in the first ML model, it is possible to increase the efficiency of the TTT parameter change prediction.

In one example embodiment of the second aspect, the first ML model is configured as a DDQN. By using the DDQN, it is possible to increase the efficiency of the TTT parameter change prediction.

In one example embodiment of the second aspect, the method further comprises the following steps which are performed each neighboring network node of the at least one neighboring network node. A second data sub-vector is obtained by aggregating those numbers (i) and (ii) from the data vector which are interrelated at an inter-node level for a pair of the source network node and the neighboring network node. If a prediction result of the first ML model is that the TTT parameter needs to remain unchanged, a second ML model is used to predict whether a CIO parameter needs to be increased, decreased or remain unchanged. The second ML model is configured to use the prediction result of the first ML model and the second data sub-vector as input data. Thus, CIO parameter change prediction may be triggered in response to the "no change" result predicted for the TTT parameter. Similarly, by properly tuning the CIO parameter (i.e., deciding whether to increase, decrease or remain it unchanged), the network entity may reduce the number of occurrences of one or more types of HO problems (e.g., RLFs and/or PP HOs) in the wireless communication network, thereby improving the overall mobility experience.

In one example embodiment of the second aspect, the second ML model is also configured as a DDQN. By using the DDQN, it is possible to increase the efficiency of the CIO parameter change prediction.

In one example embodiment of the second aspect, the method further comprises the following steps. Another data vector is received, which comprises: (i) a number of HO attempts made between the source network node and the at least one neighboring network node within another time period, and (ii) a number of occurrences of the at least one type of HO problems between the source network node and the at least one neighboring network node during the HO attempts. Then, a difference between the numbers (ii) of the data vector and said another data vector is calculated. Next, a reward for the data vector is calculated based on whether the difference is more than, less than or equal to a threshold value. After that, at least one of the first ML model and the second ML model is trained by using the reward. By using such a reward in the training phase of the first ML model and the second ML model, it is possible to increase their prediction accuracy.

According to a third aspect, a computer program product is provided. The computer program product comprises a computer-readable storage medium that stores a computer code. Being executed by at least one processor, the computer code causes the at least one processor to perform the method according to the second aspect. By using such a computer program product, it is possible to simplify the implementation of the method according to the second aspect in any network entity, like the network entity according to the first aspect.

According to a fourth aspect, a network entity in a wireless communication network is provided. The network entity comprises a means for receiving a data vector comprising: (i) a number of HO attempts made between a source network node and at least one neighboring network node within a time period, and (ii) a number of occurrences of at least one type of HO problems between the source network node and the at least one neighboring network node during the HO attempts. The network entity further comprises one or more means for performing the following operations for each neighboring network node of the at least one neighboring network node:

obtaining a first data sub-vector by aggregating those numbers (i) and (ii) from the data vector which are interrelated at a level of a carrier used by the source network node and the neighboring network node; and by using a first ML model, predicting whether a TTT parameter needs to be increased, decreased or remain unchanged, the first ML model being configured to use the first data sub-vector as input data.

By properly tuning the TTT parameter (i.e., deciding whether to increase, decrease or remain them unchanged), the network entity may reduce the number of occurrences of one or more types of HO problems (e.g., RLFs and/or PP HOs) in the wireless communication network, thereby improving the overall mobility experience.

Other features and advantages of the present disclosure will be apparent upon reading the following detailed description and reviewing the accompanying drawings.

BRIEF DESCRIPTION OF THE DRAWINGS

The present disclosure is explained below with reference to the accompanying drawings in which:

FIG. 7 shows one possible tabular structure of a data vector used in the method of FIG. 6;

DETAILED DESCRIPTION

Figure 1:
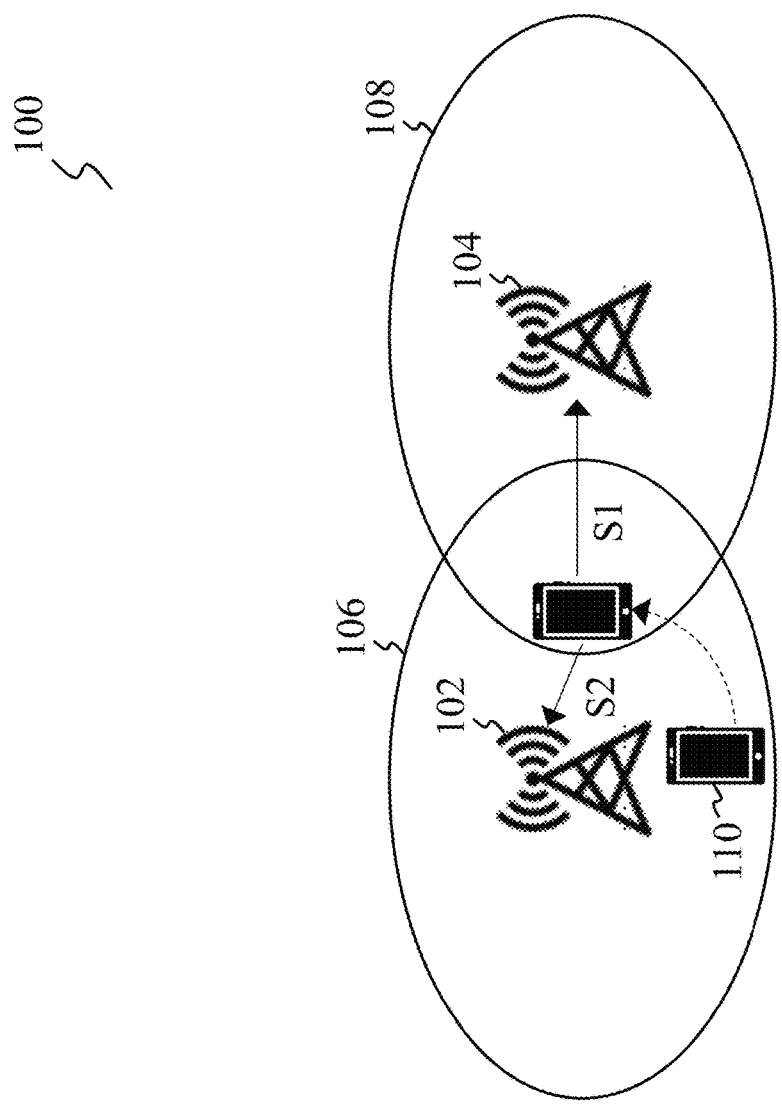
FIG. 1 schematically shows a Too-Early Type1 Handover (HO) event in a wireless communication network.

Various embodiments of the present disclosure are further described in more detail with reference to the accompanying drawings. However, the present disclosure can be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatus and method disclosed herein can be implemented in practice by using any numbers of the embodiments provided herein. Furthermore, it should be understood that any embodiment of the present disclosure can be implemented using one or more of the elements presented in the appended claims.

Unless otherwise stated, any embodiment recited herein as "example embodiment" should not be construed as preferable or having an advantage over other embodiments.

Although the numerative terminology, such as "first", "second", etc., may be used herein to describe various embodiments, elements or features, it should be understood that these embodiments, elements or features should not be limited by this numerative terminology. This numerative terminology is used herein only to distinguish one embodiment, element or feature from another embodiment, element or feature. For example, a first ML model discussed below could be called a second ML model, and vice versa, without departing from the teachings of the present disclosure.

According to the example embodiments disclosed herein, a User Equipment (UE) may refer to an electronic computing device that is configured to perform wireless communications. The UE may be implemented as a mobile station, a mobile terminal, a mobile subscriber unit, a mobile phone, a cellular phone, a smart phone, a cordless phone, a personal digital assistant (PDA), a wireless communication device, a desktop computer, a laptop computer, a tablet computer, a gaming device, a netbook, a smartbook, an ultrabook, a medical mobile device or equipment, a biometric sensor, a wearable device (e.g., a smart watch, smart glasses, a smart wrist band, etc.), an entertainment device (e.g., an audio player, a video player, etc.), a vehicular component or sensor (e.g., a driver-assistance system), a smart meter/sensor, an unmanned vehicle (e.g., an industrial robot, a quadcopter, etc.) and its component (e.g., a self-driving car computer), industrial manufacturing equipment, a global positioning system (GPS) device, an Internet-of-Things (IOT) device, an Industrial IoT (IIoT) device, a machine-type communication (MTC) device, a group of Massive IoT (MIoT) or Massive MTC (mMTC) devices/sensors, or any other suitable mobile device configured to support wireless communications. In some embodiments, the UE may refer to at least two collocated and inter-connected UEs thus defined.

As used in the example embodiments disclosed herein, a network node may refer to a fixed point of communication/communication node for a UE in a particular wireless communication network. More specifically, the network node may be used to connect the UE to a Data Network (DN) through a Core Network (CN) and may be referred to as a base transceiver station (BTS) in terms of the 2G communication technology, a NodeB in terms of the 3G communication technology, an evolved NodeB (eNodeB or eNB) in terms of the 4G communication technology, and a gNB in terms of the 5G New Radio (NR) communication technology. The network node may serve different cells, such as a macrocell, a microcell, a picocell, a femtocell, and/or other types of cells. The macrocell may cover a relatively large geographic area (e.g., at least several kilometers in radius). The microcell may cover a geographic area less than two kilometers in radius, for example. The picocell may cover a relatively small geographic area, such, for example, as offices, shopping malls, train stations, stock exchanges, etc. The femtocell may cover an even smaller geographic area (e.g., a home). Correspondingly, the network node serving the macrocell may be referred to as a macro node, the network node serving the microcell may be referred to as a micro node, and so on.

According to the example embodiments disclosed herein, a wireless communication network, in which a UE and a network node communicate with each other, may refer to a cellular or mobile network, a Wireless Local Area Network (WLAN), a Wireless Personal Area Networks (WPAN), a Wireless Wide Area Network (WWAN), a satellite communication (SATCOM) system, or any other type of wireless communication networks. Each of these types of wireless communication networks supports wireless communications according to one or more communication protocol standards. For example, the cellular network may operate according to the Global System for Mobile Communications (GSM) standard, the Code-Division Multiple Access (CDMA) standard, the Wide-Band Code-Division Multiple Access (WCDM) standard, the Time-Division Multiple Access (TDMA) standard, or any other communication protocol standard, the WLAN may operate according to one or more versions of the IEEE 802.11 standards, the WPAN may operate according to the Infrared Data Association (IrDA), Wireless USB, Bluetooth, or ZigBee standard, and the WWAN may operate according to the Worldwide Interoperability for Microwave Access (WiMAX) standard.

When a UE moves from a source cell to a neighboring cell in a wireless communication network (e.g., 5G network), a source network node (e.g., gNB) serving the source cell may initiate a Handover (HO) for the UE to a neighboring network node (e.g., another gNB) serving the neighboring cell. In other words, the source network node makes a HO attempt in this case. If multiple UEs are about to leave the source cell within a given time period, the source network node will make multiple HO attempts. Not all the multiple HO attempts may be successful; some of them may be failed due to different HO problems. Thus, the number of the HO attempts made by the source network node may be considered as the sum of the number of successful HO attempts and the number of unsuccessful (failed) HO attempts. It should be noted that the ratio of the number of unsuccessful HO attempts to the number of HO attempts is called a HO failure (HOF) ratio.

In the example embodiments disclosed herein, a HO problem may refer to any event which occurs only if a HO procedure (during a HO attempt) cannot be completed in a usual and optimal way (i.e., as defined by 3rd Generation Partnership Project (3GPP) for different communication technologies, such as 4G and 5G).

For example, the HO problem may relate to a Radio Link Failure (RLF) that occurs when a radio link connection is lost for a predetermined time duration. RLF events may be categorized into the following 3 types: Too-Late (TL) HO, Too-Early Type1 (TE1) HO, and Too-Early Type2 (TE2) HO. If mobility parameters are set in such a way that a UE does not report HO measurements on time, the UE might lose the connection with a source network node before the HO procedure is initiated. This is what is known as a TL HO event, in which the UE tries to re-establish the connection with another (neighbouring) network node after an RLF detection timer has expired. On the other hand, if the mobility parameters are set to trigger the HO procedure very early, the RLF might occur shortly after HO in a target network node. This is known as a TE1 HO event, in which the UE tries to re-establish the connection with a source network node after the RLF detection timer has expired. Even if the HO procedure is triggered at the right time, an incorrectly defined Cell Individual Offset (CIO) parameter may make the UE handover to a wrong network node, which is followed by an RLF and a re-establishment request to a network node other than the wrong network node or to the source network node. This is known as HO to a wrong cell or TE2 HO.

The HO problem may also relate to unnecessary HOs (e.g., so-called Ping-Pong (PP) HOs), which do not cause an RLF, but which increase in an unnecessary manner the amount of control data being used for a UE. In other words, in case of PP HOs, the UE is handed over back and forth between two neighboring cells for a short period of time.

FIG. 1 schematically shows a TE1 HO event in a wireless communication network 100. As shown in FIG. 1, the network 100 comprises a source network node 102 and a neighboring network node 104. The source network node 102 serves a source cell 106, and the neighboring network node 104 serves a neighboring cell 108. A UE 110 (e.g., a mobile phone) is assumed to move to the overlapping area of the cells 106 and 108, where the UE 110 experiences an HO attempt to the neighboring network node 104 but faces an RLF (see S1 in FIG. 1). The RLF may be caused, for example, by a too low value of a Time-To-Trigger (TTT) parameter. The TTT parameter is a period of time within which HO criteria must be met, before the HO itself is executed. In response to the RLF, the UE 110 tries to re-establish connection with the source network node 102 (see S2 in FIG. 2).

Figure 2:
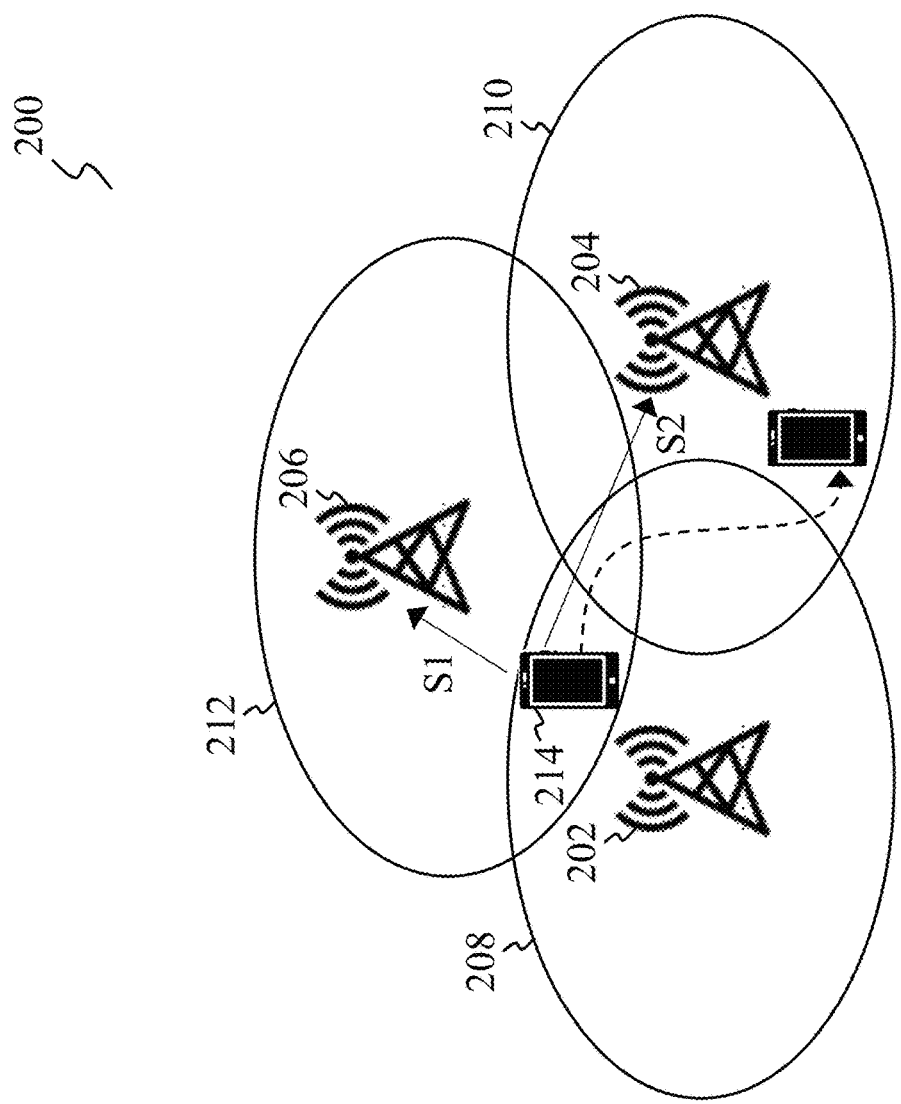
FIG. 2 schematically shows a Too-Early Type2 HO event in a wireless communication network.

FIG. 2 schematically shows a TE2 HO event in a wireless communication network 200. As shown in FIG. 2, the network 200 comprises a source network node 202 and two neighboring network nodes 204, 206. The source network node 202 serves a source cell 208, and the neighboring network nodes 204, 206 serve neighboring cells 210, 212, respectively. A UE 214 (e.g., a mobile phone) is assumed to move in the overlapping area of the cells 208-212, where the UE 214 experiences an HO attempt to the neighboring network node 206 but faces an RLF (see S1 in FIG. 2). The RLF may be caused, for example, by incorrect selection of the neighboring network node 206 as a target network node due to signal overlap at the cell edge. In response to the RLF, the UE 214 tries to establish connection with the neighboring network node 204 (see S2 in FIG. 2).

Figure 3:
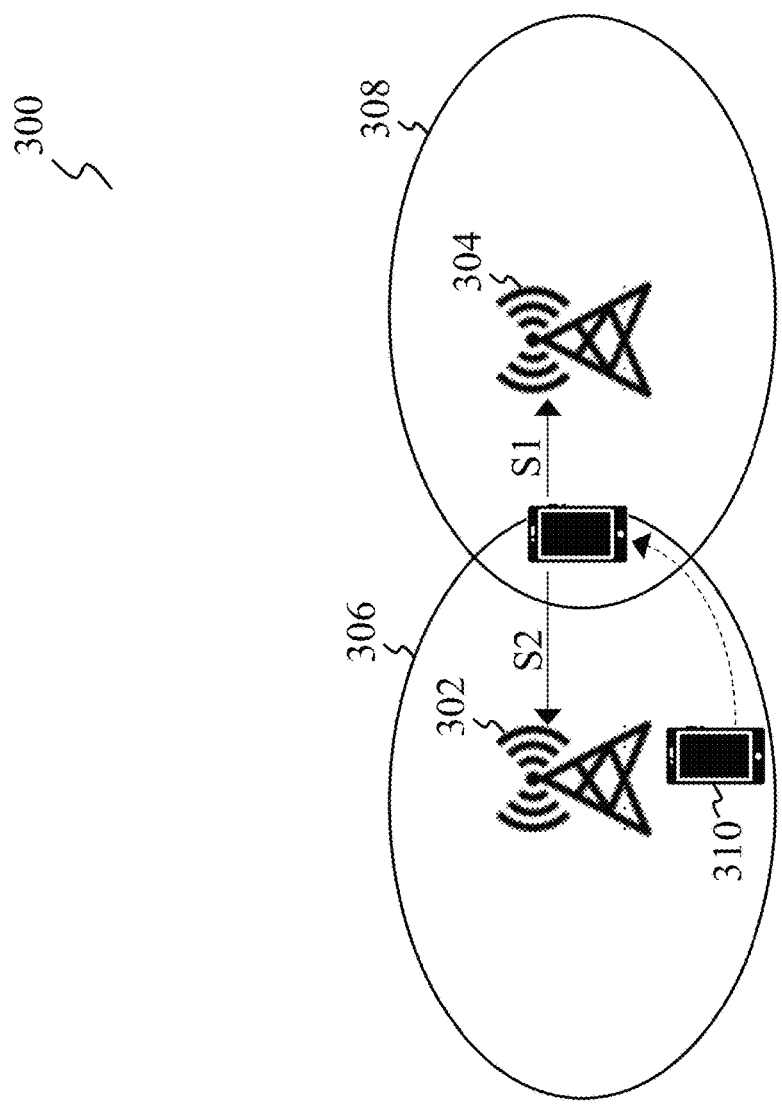
FIG. 3 schematically shows a Too-Late HO event in a wireless communication network.

FIG. 3 schematically shows a TL HO event in a wireless communication network 300. As shown in FIG. 3, the network 300 comprises a source network node 302 and a neighboring network node 304. The source network node 302 serves a source cell 306, and the neighboring network node 304 serves a neighboring cell 308. A UE 310 (e.g., a mobile phone) is assumed to move to the overlapping area of the cells 306 and 308, where the UE 310 faces an RLF, i.e., the UE 310 lost the connection with the source network node 302 before the HO procedure for the neighboring network node 304 is initiated (see S1 in FIG. 3). The RLF may be caused, for example, by a too high value of the TTT parameter. In response to the RLF, the UE 310 tries to re-establish connection with the source network node 304 (see S2 in FIG. 3).

Figure 4:
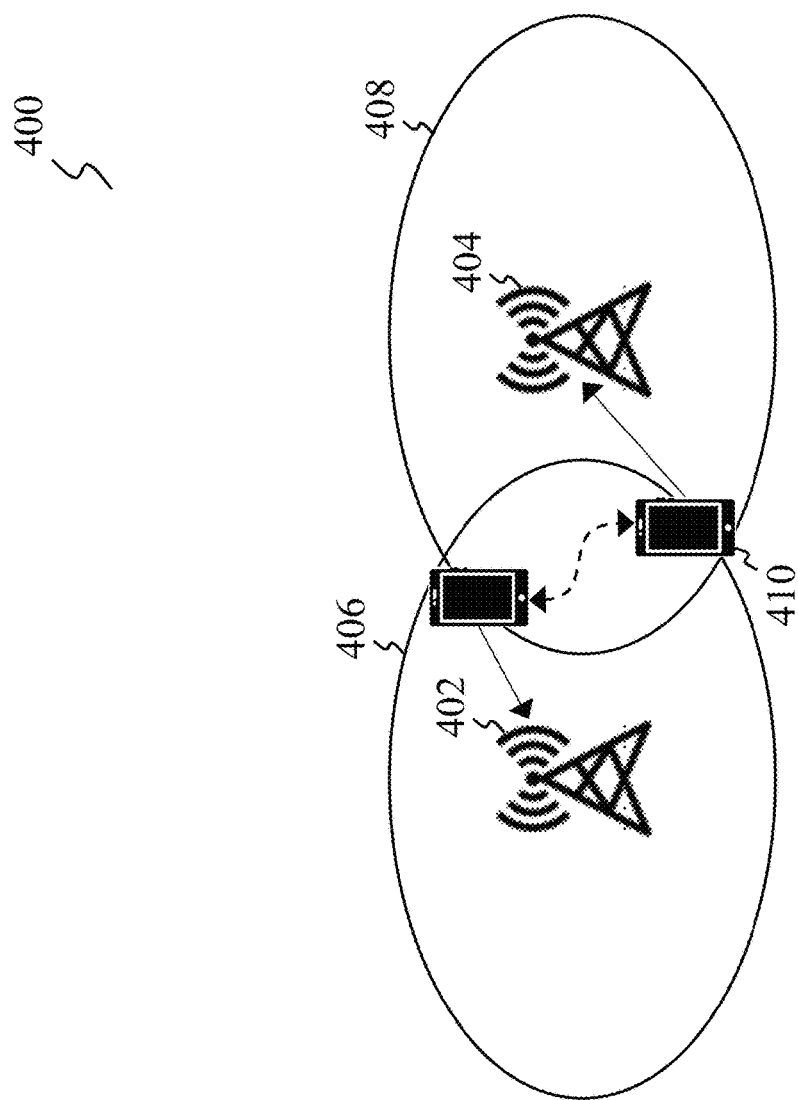
FIG. 4 schematically shows a Ping-Pong (PP) HO event in a wireless communication network.

FIG. 4 schematically shows a PP HO event in a wireless communication network 400. As shown in FIG. 4, the network 400 comprises a source network node 402 and a neighboring network node 404. The source network node 402 serves a source cell 406, and the neighboring network node 404 serves a neighboring cell 408. A UE 410 (e.g., a mobile phone) is assumed to move in the overlapping area of the cells 406 and 408 and trigger multiple unnecessary (PP) HOs between the source network node 402 and the neighboring network node 404 within a short period of time. The PP HOs may occur because of different factors, such as specific UE behavior, radio frequency conditions in the overlapping area, inappropriate network parameterization, etc.

It should be noted that the number of occurrences of each of the undesirable events shown in FIGS. 1-4 may be minimized by properly tuning the CIO and TTT parameters. More specifically, the number of occurrences of each of the TE1, TE2 and PP HO events shown in FIGS. 1, 2 and 4, respectively, may be minimized by increasing the TTT parameter and decreasing the CIO parameter. As for the TL HO event shown in FIG. 3, its number of occurrences may be minimized by decreasing the TTT parameter and increasing the CIO parameter.

The example embodiments disclosed herein provide a technical solution that allows mobility experience to be improved by properly tuning the CIO and/or TTT parameters in a wireless communication network. More specifically, information about a number of HO attempts made between a source network node and each of its neighboring network nodes for a predefined period of time and a number of occurrences of each type of the HO problems (e.g., TE1 HO, TE2 HO, TL HO, PP HO) during the HO attempts are collected as a data vector. Then, for each neighboring network node, a first data sub-vector is obtained by aggregating those numbers from the data vector which are interrelated at a level of a carrier used by the source network node and the neighboring network node, and a second data sub-vector is obtained by aggregating those numbers from the data vector which are interrelated at an inter-node level for a pair of the source network node and the neighboring network node. After that, the first data sub-vector is used by a first Machine-Learning (ML) model to predict whether the TTT parameter needs to be increased, decreased or remain unchanged. If the "no change" result is predicted for the TTT parameter, this causes a second ML model to perform CIO parameter change prediction by using the result of the first ML model and the second data sub-vector as input data.

It should be noted that the CIO parameter is defined individually for each neighbor relation, which may be represented as a source node/cell-neighboring node/cell pair (i.e., at an inter-node or inter-cell level). As for the TTT parameter, it is a cell level parameter that is defined separately for each target Evolved Universal Terrestrial Radio Access (E-UTRA) Absolute Radio Frequency Channel Number (EARFCN) pertaining to a source cell. For example, if a source network node has (target) neighboring network nodes across 3 carriers, the source network node will have 3 TTT values, one for each target EARFCN. Each unique relation of the source network node or source cell to the target EARFCN may be represented as a source node-carrier or source cell-carrier pair (i.e., at the level of the carrier used by the source and neighboring network nodes). If source and target EARFCNs are the same, an intra-frequency neighbor scenario takes place; if they are different, this relates to an inter-frequency neighbor scenario. Given the above, one can say that the first data sub-vector is obtained by aggregating the data (i.e., numbers) from the data vector for each source cell-neighboring cell pair, while the second data sub-vector is obtained by aggregating the data (i.e., numbers) from the data vector for each source cell-carrier pair.

Figure 5:
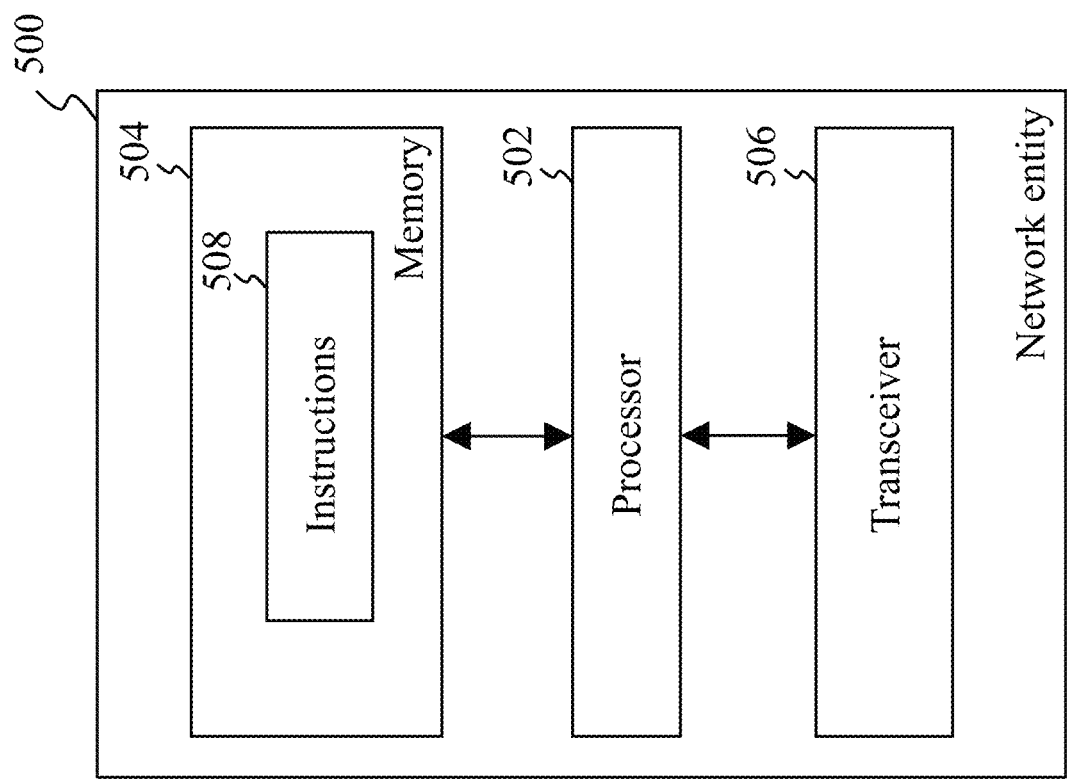
FIG. 5 shows a block diagram of a network entity in accordance with one example embodiment.

FIG. 5 shows a block diagram of a network entity 500 in accordance with one example embodiment. The network entity 500 is intended to communicate with one or more network nodes (e.g., gNBs) in any of the above-described wireless communication networks. The network entity 500 may be implemented as part of a Near-Real Time Radio Intelligent Controller (Near-RT RIC), but the present disclosure is not limited to this implementation example of the network entity 500. As shown in FIG. 5, the network entity 500 comprises a processor 502, a memory 504, and a transceiver 506. The memory 504 stores processor-executable instructions 508 which, when executed by the processor 502, cause the processor 502 to perform the aspects of the present disclosure, as will be described below in more detail. It should be noted that the number, arrangement, and interconnection of the constructive elements constituting the network entity 500, which are shown in FIG. 5, are not intended to be any limitation of the present disclosure, but merely used to provide a general idea of how the constructive elements may be implemented within the network entity 500. For example, the processor 502 may be replaced with several processors, as well as the memory 504 may be replaced with several removable and/or fixed storage devices, depending on particular applications. Furthermore, in some embodiments, the transceiver 506 may be implemented as two individual devices, with one for a receiving operation and another for a transmitting operation. Irrespective of its implementation, the transceiver 506 is intended to be capable of performing different operations required to perform the data reception and transmission, such, for example, as signal modulation/demodulation, encoding/decoding, etc. In other embodiments, the transceiver 506 may be part of the processor 502 itself.

The processor 502 may be implemented as a CPU, general-purpose processor, single-purpose processor, microcontroller, microprocessor, application specific integrated circuit (ASIC), field programmable gate array (FPGA), digital signal processor (DSP), complex programmable logic device, etc. It should be also noted that the processor 502 may be implemented as any combination of one or more of the aforesaid. As an example, the processor 502 may be a combination of two or more microprocessors.

The memory 504 may be implemented as a classical nonvolatile or volatile memory used in the modern electronic computing machines. As an example, the nonvolatile memory may include Read-Only Memory (ROM), ferroelectric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The processor-executable instructions 508 stored in the memory 504 may be configured as a computer-executable program code which causes the processor 502 to perform the aspects of the present disclosure. The computer-executable program code for carrying out operations or steps for the aspects of the present disclosure may be written in any combination of one or more programming languages, such as Java, C++, or the like. In some examples, the computer-executable program code may be in the form of a high-level language or in a pre-compiled form and be generated by an interpreter (also pre-stored in the memory 504) on the fly.

Figure 6:
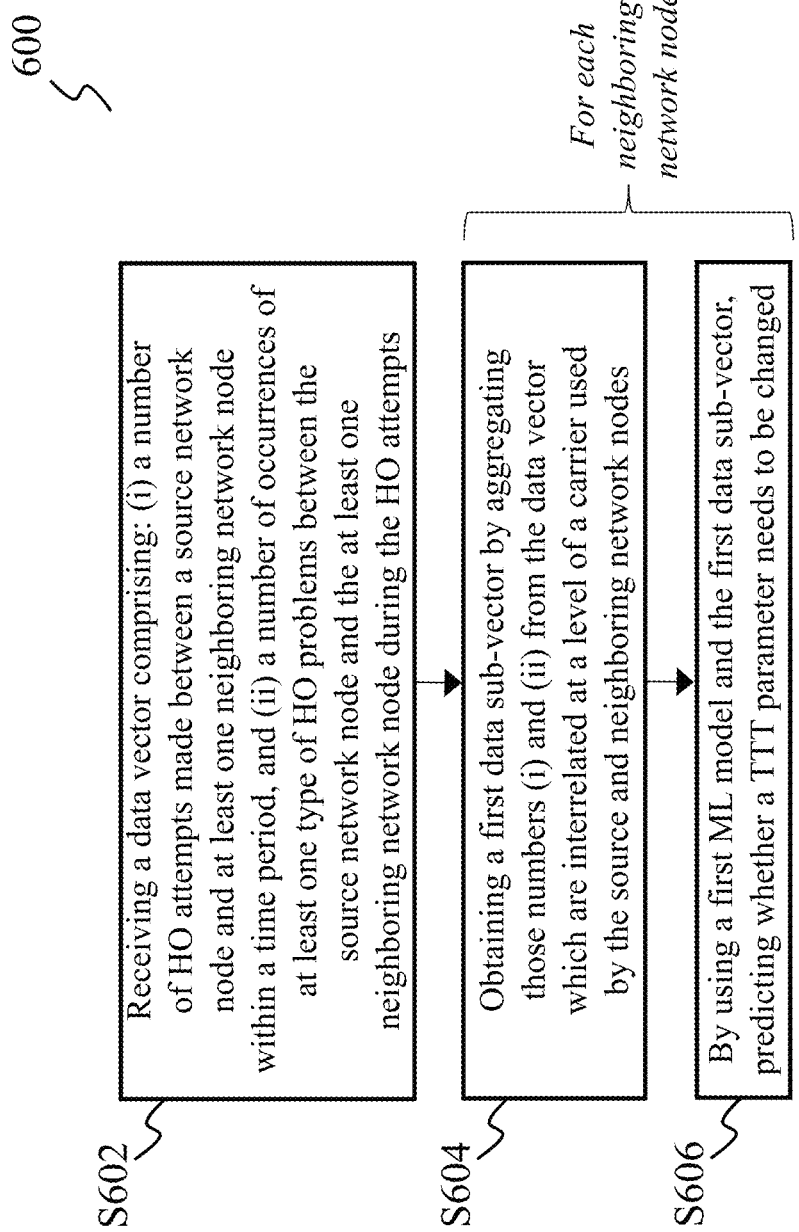
FIG. 6 shows a flowchart of a method for operating the network entity of FIG. 5 in accordance with a first example embodiment.

FIG. 6 shows a flowchart of a method 600 for operating the network entity 500 in accordance with a first example embodiment.

The method 600 starts with a step S602, in which the processor 502 receives a data vector comprising: (i) a number of HO attempts made between a source network node and at least one neighboring network node within a (last) time period, and (ii) a number of occurrences of at least one type of HO problems between the source network node and the at least one neighboring network node during the HO attempts. As noted earlier, the types of HO problems may include, but not limited to, TE1 HO, TE2 HO, TL HO, and the PP HO. Each network node may be equipped with HO problem type-specific counters and may periodically (every "n" duration, where n is the optimization cycle period) report the counter values to the network entity 500, so that the processor 502 may trace changes in the trend of each type of HO problems by comparing the current data vector with the past data vector, as will be explained below in detail.

In some embodiments, the processor 502 may supplement, in or after the step S602, the data vector with one or more of the following values (hyper-features):

RLF_RATIO=(TE1+TE2+TL)/(HOatt+TL),

TF_TS_diff=abs[((TE1+TE2)−TL)/(TE+TL)], and

PP_RATIO=PP/HOatt, where TE1 is the number of occurrences of the TE1 HO between the source network node and each of its neighboring network nodes, TE2 is the number of occurrences of the TE2 HO between the source network node and each of its neighboring network nodes, TE=TE1+TE2, TL is the number of occurrences of the TL HO between the source network node and each of its neighboring network nodes, PP is the number of occurrences of the PP HO between the source network node and each of its neighboring network nodes, and HOatt is the number of the HO attempts made between the source network node and each of its neighboring network nodes.

FIG. 7 shows one possible tabular structure of the data vector used in the method 600. As shown in FIG. 7, in addition to the features TE1, TE2, TL, PP and HOatt, the data vector received at time instant T0 may also comprise the above-indicated hyper-features RLF_RATIO, TF_TS_diff (in modulus) and PP_RATIO, as well as a source cell ID (i.e., Cell_A), a target neighboring cell ID (i.e., Cell_B), a duplex scheme (i.e., Frequency-Division Duplexing (FDD)/Time-Division Duplexing (TDD)), a source cell EARFCN, a target neighboring cell EARFCN, TF_KPI_RATIO (i.e., the ratio of the number of occurrences of TE1 HO and TE2 HO to the total number of RLFs), and TS_KPI_RATIO (i.e., the ratio of the number of occurrences of TL HO to the total number of RLFs). The last two hyper-features are defined as follows:

TF_KPI_RATIO=(TE1+TE2)/(TE1+TE2+TL),

TS_KPI_RATION=TL/(TE1+TE2+TL).

The last column ("CIO/TTT") in the tabular structure of the data vector in FIG. 7 is intended for the result of CIO/TTT parameter change prediction (i.e., "increase", "decrease", "no change"). It should be noted that the CIO parameter change prediction is triggered when the "no change" result is predicted for the TTT parameter, as will be discussed below in more detail.

After the step S602, the method proceeds to steps S604 and S606 performed for each neighboring network node in sequence or in parallel, depending on the performance of the processor 502.

In the step S604, the processor 502 obtains a first data sub-vector by aggregating those numbers (e.g., those numbers of occurrences of the TE1 HO, TE2 HO, TL HO, PP HO, or any combination thereof) from the data vector which are interrelated at the level of the carrier used by the source network node and the corresponding neighboring network node. In other words, the numbers from the data vector which are required for the TTT parameter change prediction have to be aggregated for each source cell-carrier pair.

Next, in the step S606, the processor 502 uses a first ML model to predict whether the TIT parameter needs to be changed (i.e., whether it should be increased, decreased or remain unchanged). The first ML model is configured to use the first data sub-vector as input data.

In one embodiment, the method 600 comprises additional steps, in which the processor 502 performs the CIO parameter change prediction for each of the neighboring network nodes. More specifically, the CIO parameter change prediction is performed in response to the "no change" (which is equivalent to "remain unchanged") result predicted for the TTT parameter in the step S606. For this purpose, the processor 502 obtains a second data sub-vector by aggregating those numbers (e.g., those numbers of occurrences of the TE1 HO, TE2 HO, TL HO, PP HO, or any combination thereof) from the data vector which are interrelated at an inter-node level for the pair of the source network node and the corresponding neighboring network node. In other words, the numbers from the data vector which are required for CIO parameter change prediction have to be aggregated for each source cell-target cell (neighbor relation) pair. After that, the processor 502 uses a second ML model to predict whether the CIO parameter needs to be changed (i.e., whether it should be increased, decreased or remain unchanged). The second ML model is configured to use the prediction result of the first ML model and the second data sub-vector as input data.

The first and second ML models should be pre-trained. Their training may be performed as follows: features for the data vector (i.e., the above-indicated counter values or numbers) may be collected for at least 2 days, whereupon the features may be aggregated as per the optimization cycle duration and correlated along with the CIO and TTT parameters, thereby obtaining the first and second data sub-vectors. The first and second ML models may use the corresponding aggregated features of the data vector for the CIO and TTT parameter change prediction (i.e., "decrease", "increase", or "no change"). Each of the first and second ML models may be configured as a Double Deep Q-Network (DDQN) or any other reinforcement learning model. Each of the first and second ML models may be integrated with a custom reward function which, for every parameter change recommendation, analyzes a reward gain obtained based on the number of occurrences of each type of HO problems (e.g., RLFs and PP HO) and drives the model re-training and inference. In the inference mode, each of the first and second models takes into consideration corresponding one of the first and second data sub-vectors and, based on it, the ML model recommends the best action to be taken for the CIO/TTT parameter (i.e., "decrease", "increase", or "no change"). From model re-training perspective, each of the first and second ML models looks at the above-indicated counter values (e.g., the TE1, TE2, TL and PP values) across subsequent optimization cycles along with the change in the CIO/TTT parameters and learns the pattern in terms of the reward gain obtained across each change. Thus, for the first and second data sub-vectors, the first and second ML models evaluate all the possible outcomes with respect to the predicted reward gain and recommend the CIO and TTT parameter changes for which maximum rewards may be achieved.

Figure 8:
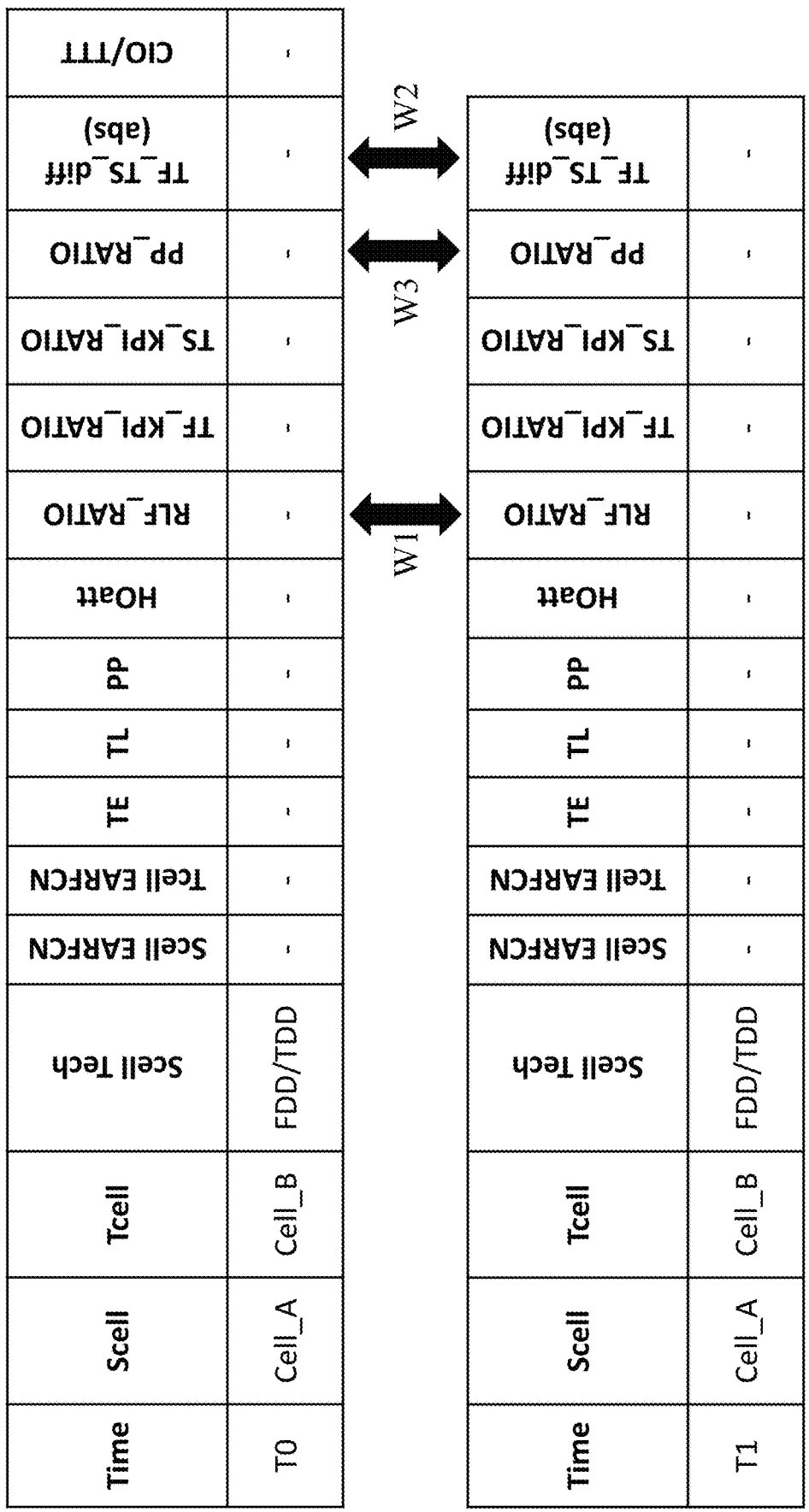
FIG. 8 schematically explains how a reward may be calculated by comparing data vectors for adjacent periods of time T0 and T1.

FIG. 8 schematically explains how a reward may be calculated by comparing data vectors for adjacent periods of time T0 and T1. It should be noted that the data vectors should not necessarily correspond to the adjacent periods of time; in some other embodiments, they may correspond simply to different periods of time. In FIG. 8, W1, W2, W3 are weights assigned to the three hyper-features RLF_RATIO, PP_RATIO, and TF_TS_diff in order to calculate the reward. Based on the comparison of the two data vectors, the overall reward is calculated as follows. Each of the hyper-features RLF_RATIO, PP_RATIO, and TF_TS_diff obtained at T1 is compared with the respective value at T0. The individual feature rewards are calculated, for example, based on the following conditions:

Condition 1: If T1 value<(T0 value+threshold), assign a positive reward (R1), e.g., +2;

Condition 2: If T1 value "is within" (T0 value+/−threshold), assign a positive reward (R2), e.g., +1;

Condition 3: If T1 value>(T0 value+threshold), assign a negative reward (R3), e.g., −2;

The threshold value may be set to a small value, such as 0.02.

The above conditions are checked for all the 3 hypo-features and based on the individual feature rewards, the composite reward score is obtained using the feature weights, for example, as follows: W1.R1+W2.R2+W3.R3.

Figure 9:
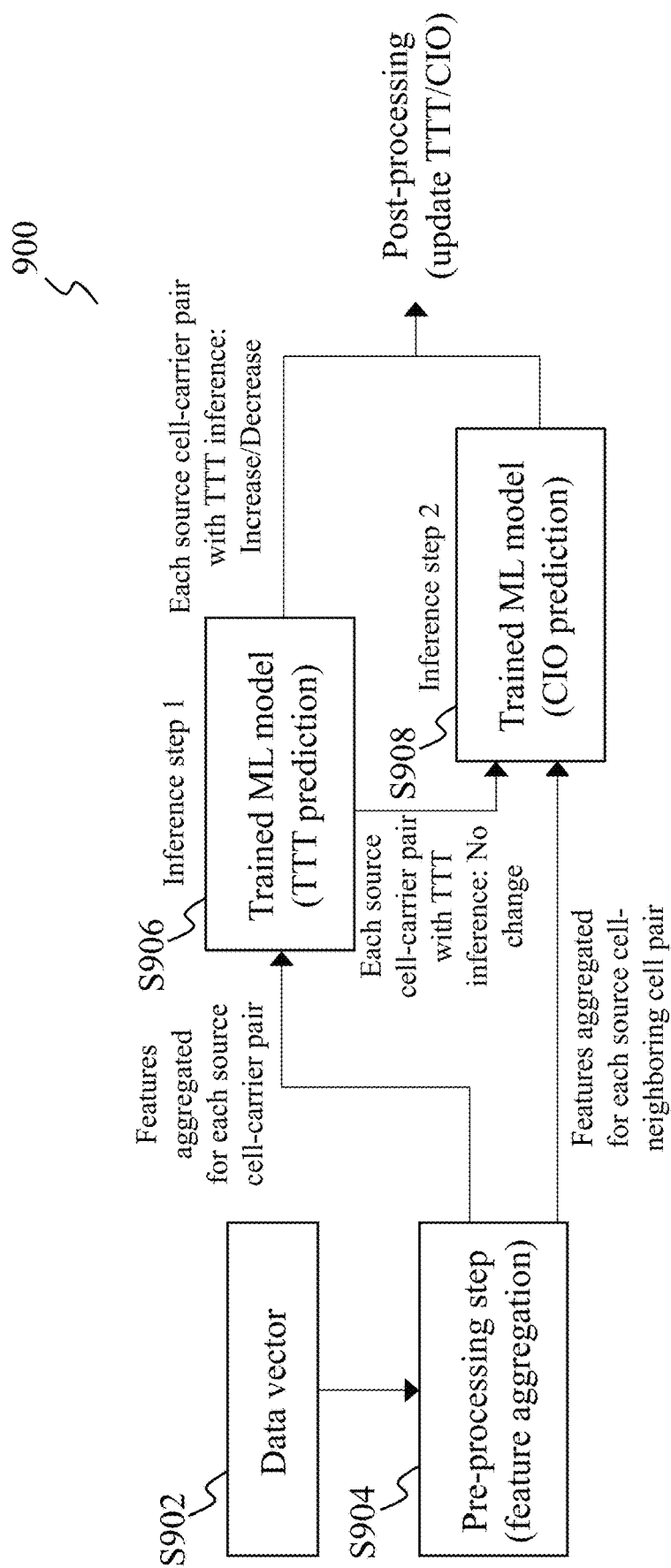
FIG. 9 shows a flowchart of a method for operating the network entity of FIG. 5 in accordance with a second example embodiment.

FIG. 9 shows a flowchart of a method 900 for operating the network entity of FIG. 5 in accordance with a second example embodiment. In general, the method 900 corresponds to the method 600 supplemented with the second ML model. The method 900 starts with a step S902, which is similar to the step S606 of the method 600. In a next step S904, the processor 502 obtains the first and second data sub-vectors, as discussed above. In other words, the step S904 corresponds to the combination of the step S604 of the method 600 and the step consisting in obtaining the second data sub-vector. The processor 502 may obtain the first and second data sub-vectors in parallel, if required and depending on its performance. After the step S904, the method 900 goes to a step S906, which is similar to the step S606 of the method 600. If the first ML model predicts, in the step S906, that no change is required for the TTT parameter of one or more neighboring cells, this prediction result is provided as the additional input data to the second ML model for the CIO parameter change prediction in a next step S908. In general, TTT and CIO parameter changes have a similar impact on each type of HO problems (e.g., RLFs and PP HOs), at the source cell-carrier and source cell-neighboring cell levels, respectively. Adequately, the 1st step of prediction involves evaluating the neighboring cell(s) for TTT-based changes, i.e., each source cell-carrier pair with a dominant failure category. For specific cell-carrier pairs with a mixed failure category scenario, for which the first ML model does not recommend any TTT optimization, the second step of prediction is triggered by using the second ML model.

As also follows from FIG. 9, the inference of each of the first and second ML models may be provided to a post-processing component (not shown) in the form of a pre-dicted category, i.e., "increase/decrease/no change" for any of the CIO and TTT parameters. Now, the complexity lies in applying each predicted change to the relevant parameter. As for the CIO parameter, its change predicted by the second ML model may be done for a specific source cell-neighboring cell pair and may be straightaway applied to that particular pair. As for the TTT parameter, it is set for each source cell-carrier pair and has separate parameters defined for intra/inter frequency neighboring cells, as shown below:

| Parameter Name | Abbreviation |
|---|---|
| A3 time to trigger | a3TimeToTrigger |
| A3 time to trigger RSRP inter frequency | a3TimeToTriggerRsrpInterFreq |
| A3 time to trigger RSRQ inter frequency | a3TimeToTriggerRsrqInterFreq |
| A5 time to trigger | a5TimeToTrigger |
| A5 time to trigger inter frequency | a5Time To TriggerInterFreq |
| RSRQ A5 inter-frequency time to trigger | a5TimeToTriggerRsrqInterFreq |

In order to set the TTT parameter value, for each corresponding source cell, a unique target carrier frequency group is determined, and inferencing is done for each source cell-carrier combination. If there is a change recommended by the first ML model for a particular source cell-carrier pair, the respective TTT parameter applicable for that source cell-carrier pair (intra/inter) is modified as per the predicted category.

Figure 10:
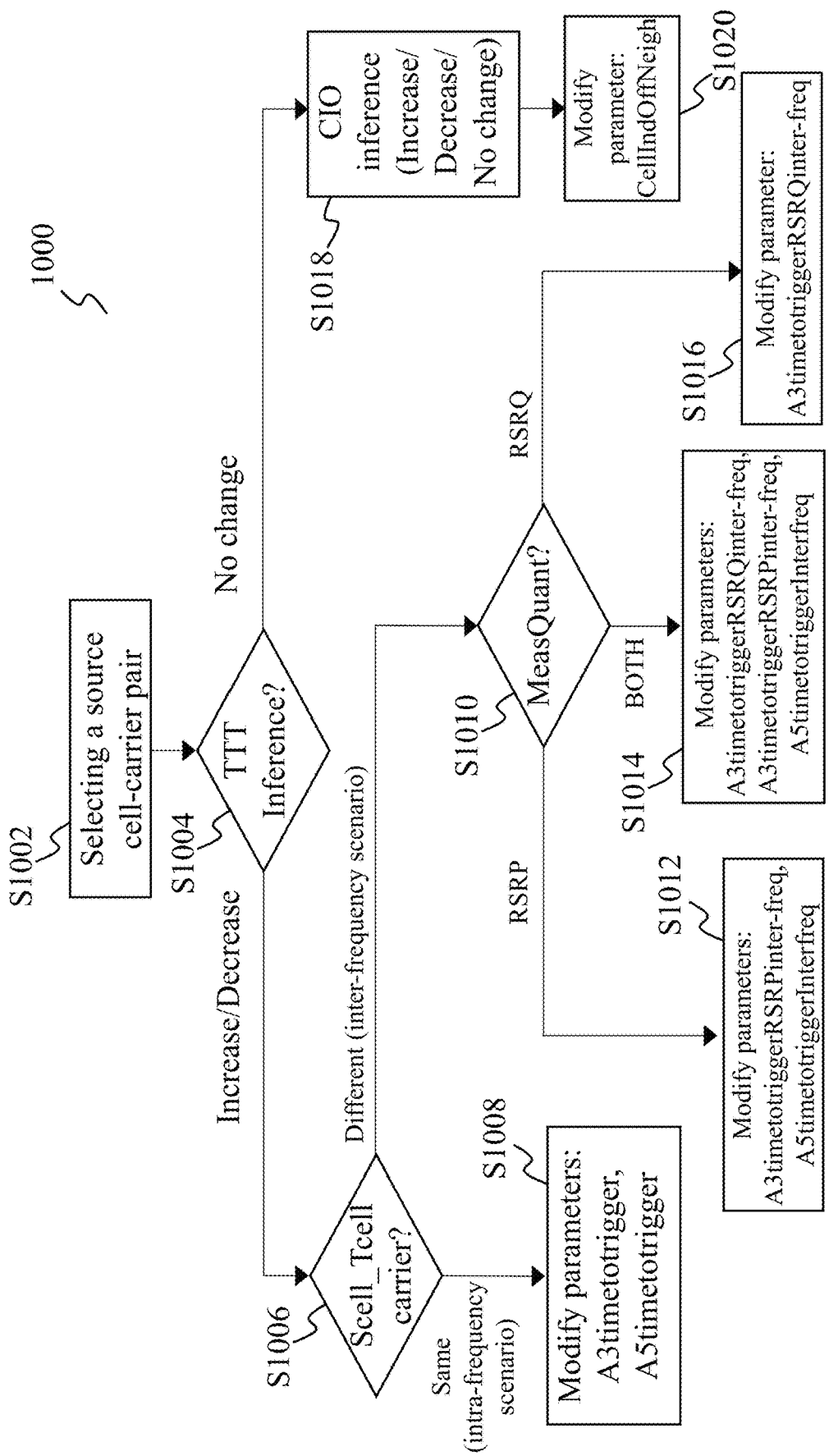
FIG. 10 shows a flowchart of a method for updating Time-To-Trigger (TTT) parameters based on the outcome of the method of FIG. 6.

FIG. 10 shows a flowchart of a method 1000 for updating TTT parameters based on the outcome of the method 600 in accordance with one exemplary embodiment. Similar to the methods 600 and 900, the method 1000 may be executed by the Near-RT RIC. The method 1000 starts with a step S1002, in which a particular source cell-carrier pair is selected (in other words, a certain EARFCN is selected). Next, the method 1000 proceeds to a step S1004, in which the TTT inference obtained by the using the method 600 or 900 is checked. If it is predicted that the TTT parameter needs to be increased/decreased, the method 1000 goes on to a step S1006, in which it is checked whether an inter-frequency or intra-frequency scenario is under consideration. If the inter-frequency scenario takes place, the method 1000 proceeds to a step S1008, in which it is recommended to modify the following parameters: A3timetotrigger and A5timetotrigger. If the intra-frequency scenario takes place, the method 1000 proceeds to a step S1010, in which a type of measurement quality is checked. If the measurement quality is represented by a Reference Signal Received Power (RSRP), then the method goes on to a step S1012, in which it is recommended to modify the following parameters: A3timetotrigger-RSRPinter-freq and A5timetotriggerInterfreq. If the measurement quality is represented by the RSRP and a Reference Signal Received Quality (RSRQ), then the method goes on to a step S1014, in which it is recommended to modify the following parameters: A3timetotrigger-RSRQinter-freq, A3timetotriggerRSRPinter-freq and A5timetotriggerInterfreq. If the measurement quality is represented by the RSRQ only, then the method goes on to a step S1016, in which it is recommended to modify the following parameter: A3timetotriggerRSRQinter-freq. Referring back to the step S1004, If it is predicted that the TTT parameter needs to remain unchanged, the method 1000 goes on to a step S1018, in which the CIO inference is obtained by using the method 900 (with the two ML models used as shown in FIG. 9). In a next step S1020, it is recommended to modify the following parameter: CellIndOffNeigh.

It should be noted that each step or operation of the methods 600, 900 and 1000, or any combinations of the steps or operations, can be implemented by various means, such as hardware, firmware, and/or software. As an example, one or more of the steps or operations described above can be embodied by processor executable instructions, data structures, program modules, and other suitable data representations. Furthermore, the processor-executable instructions which embody the steps or operations described above can be stored on a corresponding data carrier and executed by the processor 502. This data carrier can be implemented as any computer-readable storage medium configured to be readable by said at least one processor to execute the processor executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

Although the example embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or operations, and the indefinite article "a" or "an" does not exclude a plurality. The mere fact that certain measures are recited in mutually different dependent claims does not indicate that a combination of these measures cannot be used to advantage.

The invention claimed is:

1. A network entity in a wireless communication network, comprising:
   at least one processor; and
   at least one memory storing instructions that, when executed by the at least one processor, cause the network entity at least to:
   receive a data vector comprising: (i) a number of Handover (HO) attempts made between a source network node and at least one neighboring network node within a time period, and (ii) a number of occurrences of at least one type of HO problems between the source network node and the at least one neighboring network node during the HO attempts;
   for each of the at least one neighboring network node:
      obtain a first data sub-vector by aggregating those numbers (i) and (ii) from the data vector which are interrelated at a level of a carrier used by the source network node and the neighboring network node; and
      by using a first Machine-Learning (ML) model, predict whether a Time-To-Trigger (TTT) parameter needs to be increased, decreased or remain unchanged, the first ML model being configured to use the first data sub-vector as input data;
      obtain a second data sub-vector by aggregating those numbers (i) and (ii) from the data vector which are interrelated at an inter-node level for a pair of the source network node and the neighboring network node; and
      if a prediction result of the first ML model is that the TTT parameter needs to remain unchanged, predict, by using a second ML model, whether a Cell Individual Offset (CIO) parameter needs to be increased, decreased or remain unchanged, the second ML model being configured to use the prediction result of the first ML model and the second data sub-vector as input data.

2. The network entity of claim 1, wherein the at least one type of HO problems comprises at least one of:
   Too-Late HO;
   Too-Early Type 1 HO;
   Too-Early Type 2 HO; and
   Ping-Pong (PP) HO.

3. The network entity of claim 2, wherein the network entity is further caused to supplement the data vector with at least one of the following values:

RLF_RATIO=(TE1+TE2+TL)/(HOatt+TL),

TF_TS_diff=abs[((TE1+TE2)−TL)/(TE+TL)], and

PP_RATIO=PP/HOatt, where
   TE1 is a number of occurrences of the Too-Early Type 1 HO between the source network node and each of the at least one neighboring network node,
   TE2 is a number of occurrences of the Too-Early Type 2 HO between the source network node and each of the at least one neighboring network node,

TE=TE1+TE2,

TL is a number of occurrences of the Too-Late HO between the source network node and each of the at least one neighboring network node,
   PP is a number of occurrences of the PP HO between the source network node and each of the at least one neighboring network node, and
   HOatt is a number of the HO attempts made between the source network node and each of the at least one neighboring network node.

4. The network entity of claim 1, wherein the first ML model is configured as a Double Deep Q-Network (DDQN).

5. The network entity of claim 1, wherein the second ML model is configured as a DDQN.

6. The network entity of claim 1, wherein the network entity is further caused to:
   receive another data vector comprising: (i) a number of HO attempts made between the source network node and the at least one neighboring network node within another time period, and (ii) a number of occurrences of the at least one type of HO problems between the source network node and the at least one neighboring network node during the HO attempts;
   calculate a difference between the numbers (ii) of the data vector and said another data vector;
   calculate a reward for the data vector based on whether the difference is more than, less than or equal to a threshold value; and
   train at least one of the first ML model and the second ML model by using the reward.

7. A method for operating a network entity in a wireless communication network, comprising:
   receiving a data vector comprising: (i) a number of Handover (HO) attempts made between a source network node and at least one neighboring network node within a time period, and (ii) a number of occurrences of at least one type of HO problems between the source network node and the at least one neighboring network node during the HO attempts;

for each of the at least one neighboring network node:
obtaining a first data sub-vector by aggregating those numbers (i) and (ii) from the data vector which are interrelated at a level of a carrier used by the source network node and the neighboring network node;

by using a first Machine-Learning (ML) model, predicting whether a Time-To-Trigger (TTT) parameter needs to be increased, decreased or remain unchanged, the first ML model being configured to use the first data sub-vector as input data;

obtaining a second data sub-vector by aggregating those numbers (i) and (ii) from the data vector which are interrelated at an inter-node level for a pair of the source network node and the neighboring network node; and if a prediction result of the first ML model is that the TTT parameter needs to remain unchanged, predicting, by using a second ML model, whether a Cell Individual Offset (CIO) parameter needs to be increased, decreased or remain unchanged, the second ML model being configured to use the prediction result of the first ML model and the second data sub-vector as input data.

8. The method of claim 7, wherein the at least one type of HO problems comprises at least one of:
Too-Late HO;
Too-Early Type 1 HO;
Too-Early Type 2 HO; and
Ping-Pong (PP) HO.

9. The method of claim 8, further comprising supplementing the data vector with at least one of the following values:

$RLF\_RATIO=(TE1+TE2+TL)/(HOatt+TL),$ $TF\_TS\_diff=abs[((TE1+TE2)-TL)/(TE+TL)],$ and $PP\_RATIO=PP/HOatt,$ where
TE1 is a number of occurrences of the Too-Early Type 1 HO between the source network node and each of the at least one neighboring network node,
TE2 is a number of occurrences of the Too-Early Type 2 HO between the source network node and each of the at least one neighboring network node, $TE=TE1+TE2,$ TL is a number of occurrences of the Too-Late HO between the source network node and each of the at least one neighboring network node,
PP is a number of occurrences of the PP HO between the source network node and each of the at least one neighboring network node, and
HOatt is a number of the HO attempts made between the source network node and each of the at least one neighboring network node.

10. The method of claim 7, further comprising:
receiving another data vector comprising: (i) a number of HO attempts made between the source network node and the at least one neighboring network node within another time period, and (ii) a number of occurrences of the at least one type of HO problems between the source network node and the at least one neighboring network node during the HO attempts;
calculating a difference between the numbers (ii) of the data vector and said another data vector;
calculating a reward for the data vector based on whether the difference is more than, less than or equal to a threshold value; and
training at least one of the first ML model and the second ML model by using the reward.

11. A non-transitory computer-readable medium, wherein the computer-readable medium stores computer code which, when executed by at least one processor, causes at least one apparatus to perform the method according to claim 7.

* * * * *